June 4, 1968 V. BENATAR 3,386,558
FEEDER MECHANISM
Original Filed Feb. 25, 1966 4 Sheets-Sheet 1

INVENTOR
VICTOR BENATAR
BY: Walter M. Rodgers
ATTORNEY

INVENTOR
VICTOR BENATAR
BY: *Walter M. Rodgers*
ATTORNEY

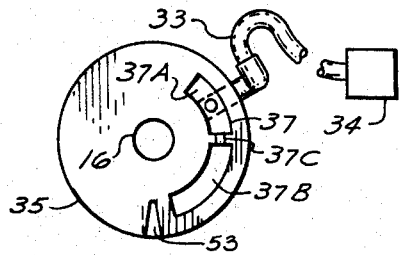
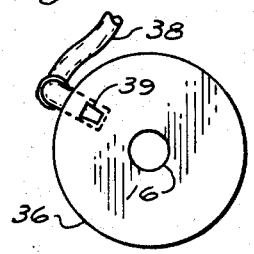
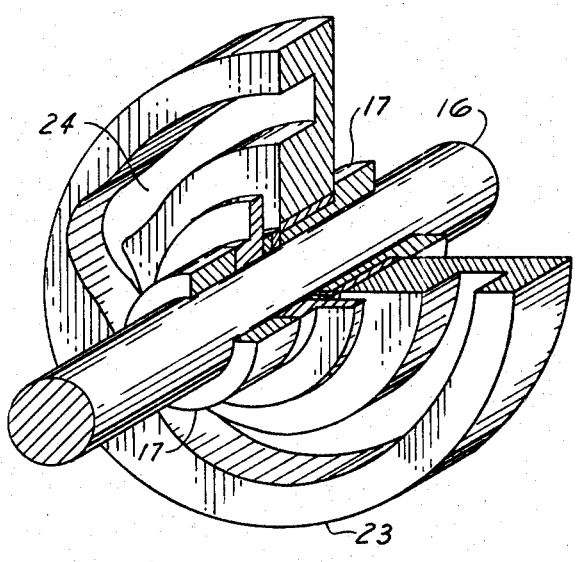
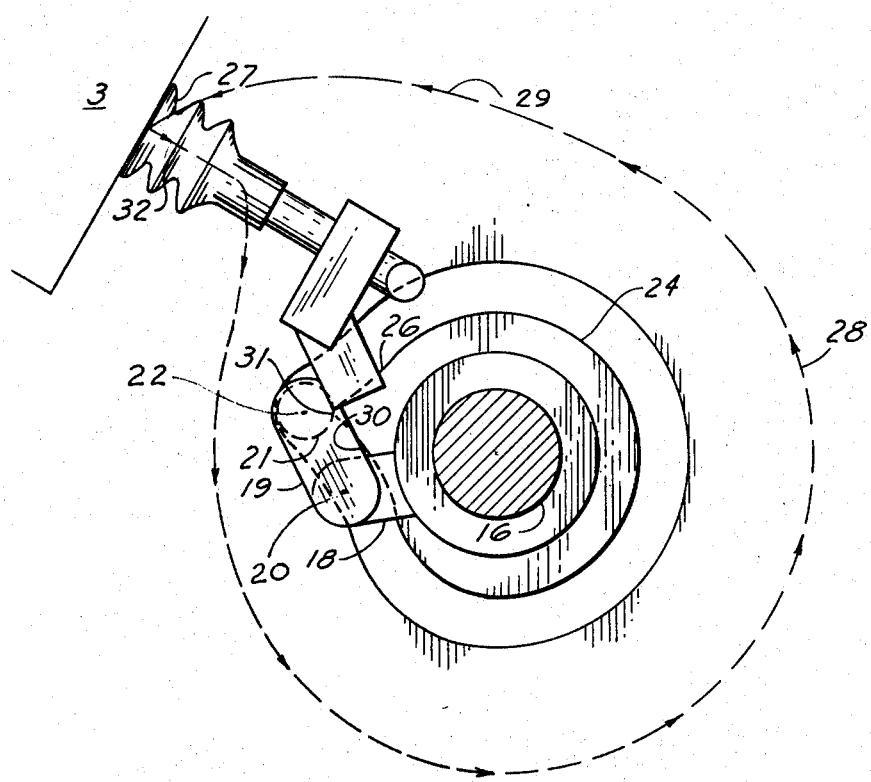
Fig. 6A
Fig. 6B
Fig. 7
Fig. 8
INVENTOR
VICTOR BENATAR
BY: Walter M. Rodgers
ATTORNEY

United States Patent Office 3,386,558
Patented June 4, 1968

3,386,558
FEEDER MECHANISM
Victor Benatar, Atlanta, Ga., assignor to The Mead Corporation, a corporation of Ohio
Continuation of application Ser. No. 530,151, Feb. 25, 1966. This application May 23, 1967, Ser. No. 640,756
6 Claims. (Cl. 198—25)

ABSTRACT OF THE DISCLOSURE

A mechanism for feeding items such as carbon blanks from a hopper is of the rotary type and is provided with one or more suction cups spaced about its periphery for sequentially engaging the items to be fed. Each suction cup is manipulated while rotating both in a radial and in an angular direction and its path of movement momentarily arrested by means of a rotatable driving element which is interconnected with an elongated driven element at one end thereof by a pivotal connection, each suction cup being securely affixed to and movable with its driven element in such manner that each increment of movement of the driven element is imparted to the suction cup. Controlled angular, rotary and radial movement is imparted to the driven element and to the suction cup by means of a cam surface formed in a fixed cam disposed adjacent the path of movement of the driven element and in which a cam follower is arranged to ride, the cam follower being affixed to the driven element intermediate the ends thereof. Pneumatic suction is applied to the suction cups sequentially, suction pressure being supplied to the suction cups by cooperating cavities one of which is arranged with a pair of sub-chambers interconnected by a bleed port whereby vacuum pressure is quickly restored following partial loss thereof to improper contact between a suction cup and its associated blank during a feeding operation.

Figure 1:
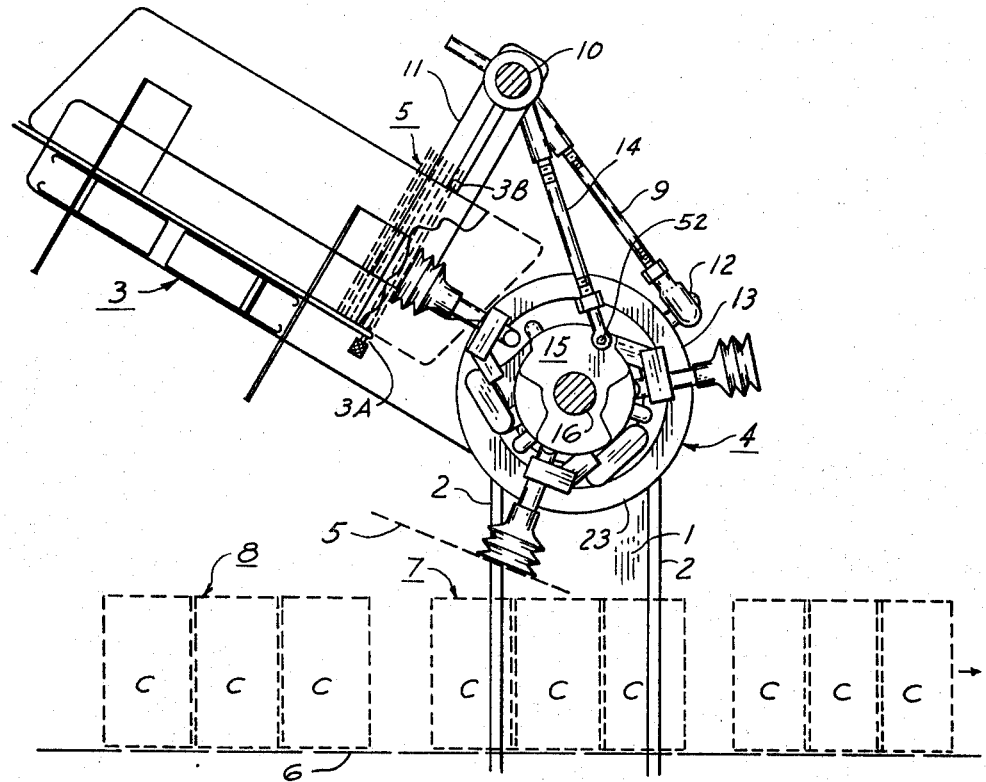

This application is a continuation of Ser. No. 530,151 filed Feb. 25, 1966, now abandoned.

This invention relates to a feeder mechanism and more particularly to a mechanism for withdrawing individual items such as carton blanks from a hopper and for then applying such items to a point of use. The invention is particularly applicable to multiple packaging machines where carton blanks are fed from a hopper structure downwardly into contact with and atop a group of articles to be packaged.

The speed of packaging machines and of other similar machines wherein individual items are fed from a hopper normally is limited by the speed with which the feeder mechanism can be made to operate. Many feed mechanisms currently in use incorporate reciprocating parts or spring biased cam followers and hence there is a definite limit to which such mechanisms may be driven insofar as speed is concerned.

A principal object of this invention is to provide a feeder mechanism of the rotary type and to construct the feeder in a simplified form using a minimum of parts so that a single rotary unit may comprise a number of individual feeder linkages and in this way to increase the effective rate of feed without driving the moving parts at excessively high velocities.

Another object of this invention is to provide a simple rotary type feeder mechanism with means for smoothly and positively modifying the path of travel of the moving parts and by so doing to enhance greatly the reliability and adaptability of the mechanism for use with blanks which are to be fed and which may be curved, warped, or characterized by some other irregularity.

The invention in one form as applied to a feeder mechanism comprises a rotatable driving element arranged to move in a substantially circular path, an elongated driven element pivotally connected at one end thereof with the driving element and arranged to change its angular position with respect thereto, a fixed cam disposed adjacent to the driven element and having a continuous cam surface, a cam follower mounted on the driven element intermediate its ends and in engagement with the cam surface, the cam surface being configured to impart circular motion to the driven element during a portion of its travel and also being constructed so as to impart movement to the driven element which is in a radial direction relative to the circular portion of its path of movement and which is angular relative to the driving element, the resultant radial movement being derived from the rotary motion of the driving element as modified by the special configuration of the cam surface and its effect on the peripheral and angular movement of the driven element.

In order positively to capture and to guide the items fed from the hopper to a point of use, a pair of guide plates may be mounted on opposite sides of the feeder driving and driven elements and the fixed cam, and a conveyor system may be used to engage the items to be fed according to a modification of the invention.

Figure 2:
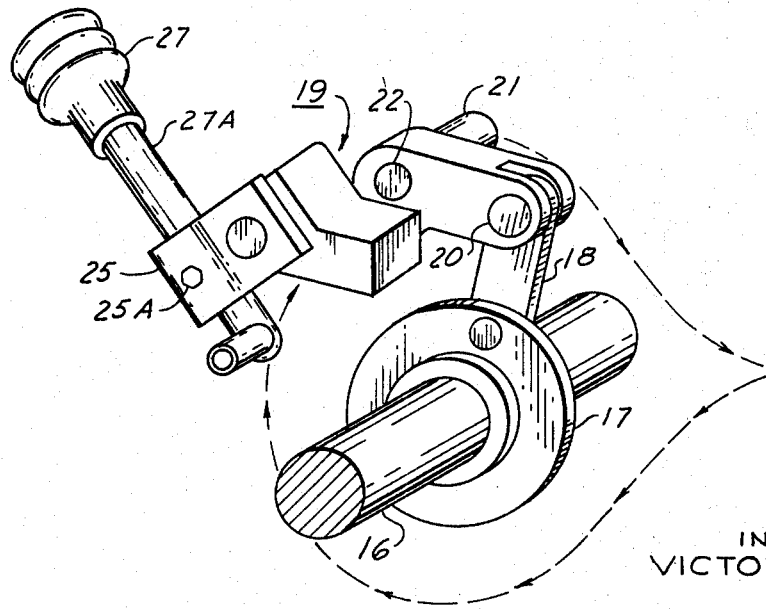
Figure 3:
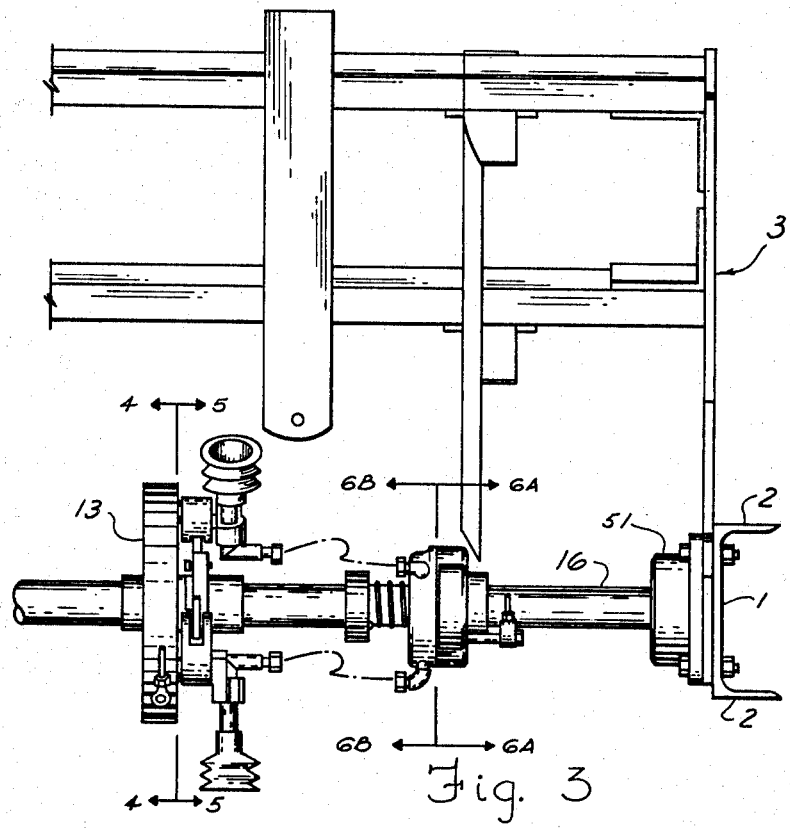
Figure 4:
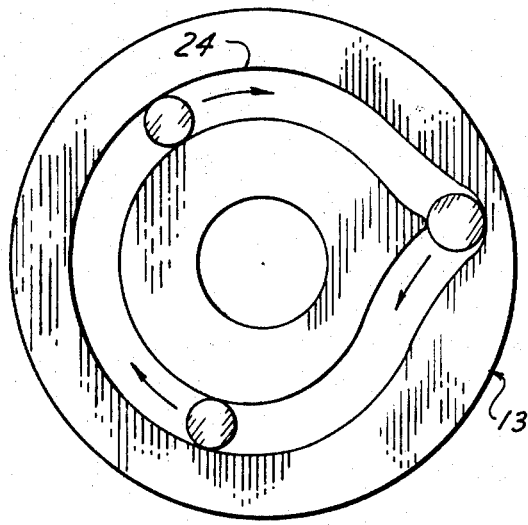
Figure 5:
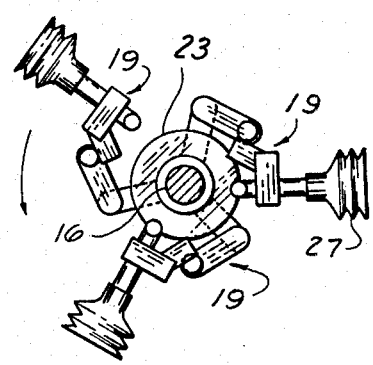
Figure 9:
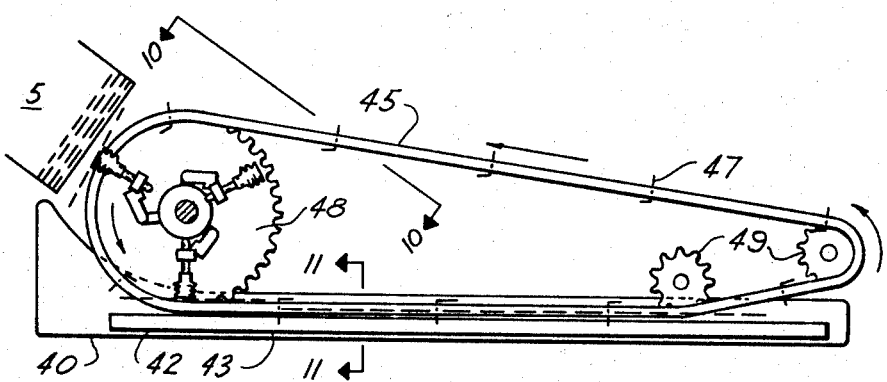
Figure 10:
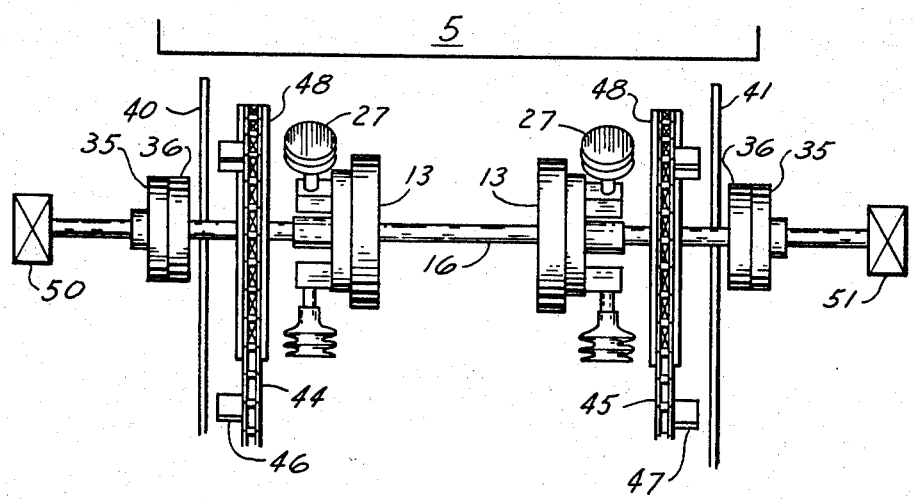
Figure 11:
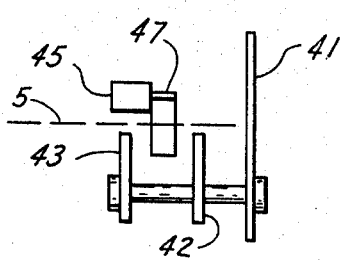

For a better understanding of the invention, reference may be had to the following detailed description taken in conjunction with the accompanying drawings in which FIG. 1 is a side view of a feeder mechanism constructed according to the invention; FIG. 2 is an enlarged perspective view of the essential elements of the feeder mechanism as view from the opposite side of the machine from that depicted in FIG. 1; FIG. 3 is a plan view of a portion of the structure depicted in FIG. 1; FIG. 4 is an enlarged view showing the continuous fixed cam which constitutes a feature of the invention and which is taken along the line designated 4—4 in FIG. 3; FIG. 5 is a view of a portion of the feeder mechanism as seen along the line designated 5—5 in FIG. 3 and which view brings out the fact that a number of feeder linkages may be mounted on a single shaft and may be controlled by a single cam surface; FIG. 6A is a view taken along the line designated 6A—6A in FIG. 3 and depicts a fixed portion of the vacuum control system; FIG. 6B is a view of a rotatable part of the vacuum control system and is taken along the line designated 6B—6B in FIG. 3; FIG. 7 is an enlarged partially cut-away perspective view of portions of the feeder mechanism showing the interrelationship between the fixed cam and its associated mounting surface; FIG. 8 is a schematic diagram showing the essential elements of the invention and their interrelation with each other whereby a gradual acceleration radially outwardly of a suction cup is effected prior to engagement between the suction cup and the lowermost carton blank followed immediately by a sudden, abrupt and radial withdrawal inwardly of the suction cup and associated parts of the mechanism; FIG. 9 is a side view similar to FIG. 1 and showing the modification of the invention as shown in FIG. 1 wherein a conveyor and guides may be used if desired; FIG. 10 is a view generally similar to FIG. 3 and taken along the line designated 10—10 in FIG. 9; and in which FIG. 11 is a detailed enlarged view taken along the line designated 11—11 in FIG. 9.

With reference to FIG. 1, the numeral 1 designates an upright channel frame support having flanges 2 on which the mechanism is mounted. A hopper structure generally designated by the numeral 3 is disposed immediately adjacent the feeder mechanism which is generally designated by the numeral 4. Carton blanks generally designated by the numeral 5 are disposed within the hopper 3. Disposed below the mechanism 4 on a conveyor belt schematically designated at 6 are several groups of items to be packaged such as are designated generally at 7 and 8. Thus, the feeder mechanism 4 withdraws a particular carton blank from the group of cartons designated at 5 and deposits the blank atop a group of articles to be packaged such as are designated at 7, the articles constituting one or a plurality of primary packages or cans such as are designated by the letter C.

Since a feeder mechanism according to this invention utilizes rotating as well as fixed parts, an adjustable bracing element 9 is interconnected at its upper end with a fixed horizontal bar 10 mounted atop suitable structural support elements 11 mounted on and forming a part of the top of the hopper 3. The bracing bar 9 is interconnected at its lower end with a fixed pin 12 on cam 13 and effectively serves to hold the cam structure 13 in fixed position.

The right hand carton blank 5 at its lower edge engages detent 3A and at its upper edge rests against cross bar 3B.

The withdrawal of carton blanks 5 from hopper 3 preferably is effected by suction cups mounted on the feeder mechanism and which engage the blank near the detent 3A. Withdrawal of the suction cup forces the blank over detent 3A and under bar 3B. Control of vacuum pressure to the individual suction cups is effected by a pneumatic mechanism some parts of which are rotatable and some parts of which are fixed. Thus, the adjustable bracing bar 14 is affixed at its upper end to the horizontal structural member 10 and at its lower end is secured with a fixed pin 52 to a fixed part 15 of the pneumatic control system so as to hold that part in fixed position and thereby to effect proper timing of suction pressure as may be required.

One important advantage of the invention is that a feeder mechanism constructed according to the invention is adaptable for use with one or more individual driven elements and associated suction cups. The arrangement depicted in FIGS. 1, 3 and 5 incorporates three suction cups arranged radially about the drive shaft 16 in symmetrical fashion. Thus, the length of a carton times the number of driven elements can approximate the circumference of the circle described by the suction cups.

One feeder mechanism is shown in perspective in FIG. 2 and comprises a rotatable driving element which includes the shaft 16 having suitable hub structure 17 and a radially arranged rotatable arm 18 which is fixedly secured to and rotatable with the shaft 16. Another essential element of the invention comprises an elongated driven element designated generally in FIG. 2 by the numeral 19. This driven element 19 is pivotally connected at 20 to the outer extremity of the arm 18 forming a part of the driving element of the invention. Elongated driven element 19 is provided intermediate its ends with a cam follower 21 rotatably mounted on a pin 22 secured to the driven element 19. Another essential element of the invention comprises the fixed cam 13 best shown in FIGS. 3 and 4. Fixed cam 13 incorporates a continuous enclosed cam surface best shown in FIG. 4 and designated by the numeral 24. The cam follower 21 is arranged to ride in the groove formed in fixed cam 23 and designated herein as the cam surface 24.

From the description thus far, it is apparent that rotation of shaft 16 and of radially disposed arm 18 at a constant speed results in motion of pivot pin 20 in a substantially circular path. Since the cam follower 21 is compelled to ride in the groove designated as the cam surface 24, it is apparent that the resulting motion of the end of the driven element 19 which is remote from the pivot pin 20 and which is designated by the numeral 25 constitutes a composite motion whereby the angular disposition of the driven element relative to the driving element is changed as well as the peripheral velocity of the end 25 of the driven element.

As is apparent from FIG. 8, the roller 21 rides along the thrust portion 26 of the cam surface 24 during the travel of the suction cup 27 out of its circular path generally designated at 28 and toward the hopper 3 while the driven element 19 approaches but does not quite arrive at a position of normal relationship to the thrust portion 26 of the cam surface 24. Thus, the travel of the suction cup 27 along the path designated at 29 is gradually outward in a generally radial direction thus insuring a smooth approach of the suction cup toward and into engagement with the lowermost carton mounted in the hopper 3. After the cam follower 21 rolls off of the thrust portion 26 of the cam surface 24 and into the withdrawal portion 30, i.e. beyond the intersection 31, the elongated driven element 19 is disposed approximately parallel with respect to the withdrawal surface 30. At this instant the radial arm 18 is approximately normal to the portion of the driven element defined by a line drawn through points 20 and 22 and is thus disposed to impart high speed withdrawal movement to the cup 27. Stated otherwise, the driven element 19 is generally tangent to the circle inscribed by point 20 as the withdrawal movement takes place. As a result, the suction cup 27 is suddenly and quickly withdrawn toward the right as viewed in FIG. 8 along the path of travel designated by the numeral 32. In this manner, a positive, abrupt and quick separation of the lowermost carton blank from the hopper 3 is effected in accordance with an important feature of the invention and is possible in part because the cam surface 24 is fully enclosed and affords full and positive control in all directions.

In order to render the feeder mechanism adaptable for different applications of the invention, the arm 27A on which suction cup 27 is mounted is adjustable relative to end 25 of driven element 19 by means of a set screw 25A as is apparent from FIG. 2.

Of course the carton blank is thereafter deposited atop a package group such as 7 as depicted generally in FIG. 1.

In order to cause the suction cup 27 to grip and subsequently to release the lowermost carton blank, a pneumatic system is employed. Thus, as is shown in FIGS. 6A and 6B vacuum is supplied from a source 34 through conduit 33 to cavity 37 in fixed valve element 35. As rotating valve element 36 changes its angular relationship to fixed valve element 35, vacuum is supplied to suction cup 27 through conduit 38 when cavity 39 in valve element 36 registers with cavity 37 in valve element 35. In FIG. 6B only one part 39 is shown. It will be understood that a plurality of such parts may be employed if desired.

As is shown in FIG. 6A, the cavity 37 is made up of two subchambers 37A and 37B interconnected by a bleed port 37C. The total accurate length of the two subchambers 37A and 37B is determined by the time driving which suction must be applied to a cup 27. If a cup 27 fails to maintain secure contact with a particular blank, the vacuum pressure in cup 27, line 38 and chamber 37 will tend to be lost. This condition is quickly corrected however due to the fact that cavity 39 soon loses contact with subchamber 37A and the high capacity vacuum source 34 is effective to quickly restore low pressure in subchamber 37A so that the next registration of a cavity such as 39 with subchamber 37A is effective to establish vacuum in the associated cup 27. When a cavity 39 registers with subchamber 37B following a loss of vacuum, atmosphere air will tend to flow into cavity 37B. This is not deleterious however because port 37C is of such size as to allow adequate vacuum to be restored in subchamber 37A during registry of the leaking cavity 39 with subchamber 37B. Thus, a succeeding cavity 39 may register with cavity 37A and adequate vacuum is present and vacuum is thus quickly restored in subchamber 37B through bleed port 37C, the preceding leaking cavity 39 having moved out of registry with subchamber 37B. Ordinarily, bleed port 37C should be substantially smaller in cross sectional area than the cross sectional area of line 33.

The vacuum in cup 27 is released when cavity 39 is in registration with cavity 53 which is exposed to atmosphere.

From the description above, it will be understood that a feeder mechanism constructed according to this invention, is characterized by a high degree of smoothness since it is of a rotary type. Furthermore, it will be understood that the mechanism is adapted for use with one or with a plurality of suction cups and may thus operate at high capacity although the rotational speed required is of a low or medium order of magnitude.

Furthermore, if larger cartons are being run, a similar structure to that disclosed in FIG. 7 may be mounted alongside the unit as shown for example in FIG. 10 so that in effect two feeders are operated off of the same shaft such as for example as shaft 16.

The modification of the invention shown in FIGS. 9, 10 and 11 is similar to that described above. In addition, the arrangement of FIGS. 9–11 incorporates a pair of guides 40 and 41 which are fixed in position and which are disposed outwardly relative to guides 42 and 43 which also are fixed in position.

In order positively to advance the blanks, a pair of continuous chains 44 and 45 are provided with lug hooks 46 and 47. Chains 44 and 45 are mounted on sprockets 48 and 49. Sprockets 48 are affixed to shaft 16 and thus are driver elements for chains 44 and 45. When the suction cup 27 once engages the carton 5 and withdraws it from the hopper 3, the suction cup continues to pull the leading edge of the carton 5 in a rotary direction until the carton 5 is completely captured by the guides 40–43 by chain 45 and by lug 47 as shown in FIG. 11. Once the carton 5 is captured, the vacuum is exhausted from suction cup 27 and the lug continues to push the carton 5 forward to obtain perfect registration with the product C. In this manner, even warped cartons may be handled by this system for the carton never is allowed to get out of control.

While particular embodiments of the invention have been shown and described, it will be understood that the invention is not limited thereto and it is intended in the appended claims to cover all such changes and modifications as fall within the true spirit and scope of the invention.

The embodiments of the invention in which an exclusive property or privilege is claimed are defined as follows:

1. A mechanism for feeding an item from a hopper, said mechanism comprising a rotatable driving element arranged to move in a substantially circular path, an elongated driven element pivotally interconnected at one end thereof with said driving element and arranged to change position bodily with respect thereto, an item engaging and feeding element fixedly mounted on and movable with said driven element in such manner that movement of said driven element causes identical angular, rotary, and radial movement of said item engaging element, a unitary cam fixed in position adjacent said driven element and having a continuous cam surface, a cam follower fixedly mounted on and movable with said driven element intermediate the ends thereof and in engagement with said cam surface, said cam surface having a portion which is generally circular and a portion which protrudes radially outward from the circular portion whereby the angular and radial disposition of said driven element and of said item engaging element relative to said driving element is changed as well as the peripheral velocity of said item engaging element entirely as a result of rotation of said driving element and the action of said cam and cam follower.

2. A mechanism according to claim 1 wherein said portion of said cam surface which protrudes radially outward comprises a withdrawal surface which is generally parallel to the portion of said driven element between said cam follower and its point of connection with said driving element so as to impart feeding movement to said item engaging element in a direction radially inward relative to the circular path of movement of said driving element whereby positive and rapid controlled angular movement is imparted to said item engaging element relative to said driving element simultaneously with a substantial reduction in the peripheral velocity of said part of said driven element.

3. A feeder mechanism comprising a rotatable driving element arranged to move in a substantially circular path, an elongated driven element interconnected at one end thereof with said driving element and arranged to change position with respect thereto, a unitary cam fixed in position adjacent said driven element and having a continuous cam surface, a cam follower mounted on said driven element intermediate the ends thereof and in engagement with said cam surface, said cam surface having a portion which is generally circular and a portion which protrudes radially outward from the circular portion whereby the angular disposition of said driven element relative to said driving element is changed as well as the peripheral velocity of the end thereof remote from said driving element, pneumatic means for engaging items to be fed, and a pair of relatively movable valve elements having cooperating cavities formed therein which register intermittently, one cavity being constructed with two sub-chambers interconnected by a bleed port.

4. A feeder mechanism comprising a rotatable driving element, a driven element interconnected with said driving element and arranged to change position with respect thereto, a cam fixed in position adjacent said driven element and having a cam surface, a cam follower mounted on said driven element and disposed to engage said cam surface, a suction cup mounted on said driven element, means including a low pressure source and a pair of relatively movable valve elements for intermittently supplying suction pressure to said suction cup, and cooperating cavities formed in said valve elements respectively, one of said cavities being arranged with a pair of sub-chambers interconnected by a bleed port.

5. A feeder mechanism comprising pneumatic means for engaging and moving items to be fed, a source of pressure less than atmospheric pressure and a pair of relatively movable valve elements interconnecting said pneumatic means and said source and having cooperating cavities formed therein which register intermittently, one cavity being constructed with two sub-chambers interconnected by a bleed port.

6. A feeder mechanism comprising a suction cup movable into engagement with an item to be fed and arranged to impart desired movement thereto, means including a low pressure source and a pair of relatively movable valve elements for intermittently supplying suction pressure to said suction cup, and cooperating cavities formed in said valve elements respectively, one of said cavities being arranged with a pair of sub-chambers interconnected by a bleed port.

References Cited

UNITED STATES PATENTS 2,915,308 12/1959 Matzen _____ 271—27
1,654,091 12/1927 Peiler _____ 198—25

RICHARD E. AEGERTER, *Primary Examiner.*